United States Patent
Xue (10) Patent No.: US 10,963,560 B2
(45) Date of Patent: Mar. 30, 2021

(54) METHOD AND APPARATUS FOR ANTI HACKER'S HIJACKING OF AUTONOMOUS VEHICLE, DEVICE AND STORAGE MEDIUM

(71) Applicant: BAIDU ONLINE NETWORK TECHNOLOGY (BEIJING) CO., LTD., Beijing (CN)

(72) Inventor: Zhao Xue, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 107 days.

(21) Appl. No.: 15/951,485

(22) Filed: Apr. 12, 2018

(65) Prior Publication Data

US 2018/0307834 A1 Oct. 25, 2018

(30) Foreign Application Priority Data

Apr. 21, 2017 (CN) .......................... 201710264485.9

(51) Int. Cl.
*G06F 21/55* (2013.01)
*B60R 25/32* (2013.01)
(Continued)

(52) U.S. Cl.
CPC .......... *G06F 21/554* (2013.01); *B60R 25/104* (2013.01); *B60R 25/32* (2013.01);
(Continued)

(58) Field of Classification Search
CPC ..... B60R 25/30; B60R 25/102; B60R 25/045; B60R 2025/0415; B60R 2025/1016
See application file for complete search history.

(56) References Cited

U.S. PATENT DOCUMENTS

| 10,384,648 B1 * | 8/2019 | Chapin ................ G05D 1/0212 |
| 2006/0089765 A1 * | 4/2006 | Pack .................... G05D 1/0061 701/23 |

(Continued)

FOREIGN PATENT DOCUMENTS

| CN | 106043222 A | 10/2016 |
| CN | 106043222 A | 10/2016 |

(Continued)

OTHER PUBLICATIONS

Chinese Search Report for Application No. 201710264485.9, dated Jul. 27, 2019, 2 Pages.
(Continued)

*Primary Examiner* — Sarah B McPartlin
(74) *Attorney, Agent, or Firm* — Lando & Anastasi, LLP (57) ABSTRACT

The present disclosure provides a method and apparatus for anti hacker's hijacking of an autonomous vehicle, a device and a storage medium, wherein the method comprises monitoring an autonomous vehicle's running data; determining whether the autonomous vehicle is hijacked by a hacker according to a monitoring result and a preset rule; activating an anti-hijack emergency handling operation if it is determined that the autonomous vehicle is hijacked by the hacker. The solution of the present disclosure may be applied to improve safety of the autonomous vehicle.

15 Claims, 4 Drawing Sheets

(51) Int. Cl.
    *B60R 25/34*     (2013.01)
    *B60R 25/104*     (2013.01)
    *B60R 25/33*     (2013.01)
    *G06F 21/31*     (2013.01)
    *B60R 25/10*     (2013.01)

(52) U.S. Cl.
    CPC .............. *B60R 25/33* (2013.01); *B60R 25/34* (2013.01); *G06F 21/316* (2013.01); *B60R 2025/1016* (2013.01)

(56) References Cited

U.S. PATENT DOCUMENTS

2015/0329079 A1    11/2015    Van Wiemeersch et al.
2017/0349139 A1    12/2017    Zhang
2018/0234446 A1*    8/2018    Conner .................. B60R 25/30

FOREIGN PATENT DOCUMENTS

CN      106094823 A      11/2016
CN      106094823 A      11/2016

OTHER PUBLICATIONS

First Office Action for Chinese Application No. 201710264485.9, dated Aug. 5, 2019, 6 Pages.
Chinese Search Report, Cited References listed in English.
1st Chinese Office Action, Cited References listed in English.

* cited by examiner

METHOD AND APPARATUS FOR ANTI HACKER'S HIJACKING OF AUTONOMOUS VEHICLE, DEVICE AND STORAGE MEDIUM

FIELD OF THE DISCLOSURE

The present disclosure relates to autonomous vehicle technologies, and particularly to a method and apparatus for anti hacker's hijacking of an autonomous vehicle, a device and a storage medium.

BACKGROUND OF THE DISCLOSURE

An autonomous vehicle means that the vehicle's surroundings are sensed by a vehicle-mounted sensing system, and the vehicle's steering and speed are controlled according to road, vehicle position and obstacle information obtained from the sensing so that the vehicle can safely and reliably travel on the road.

Figure 1:
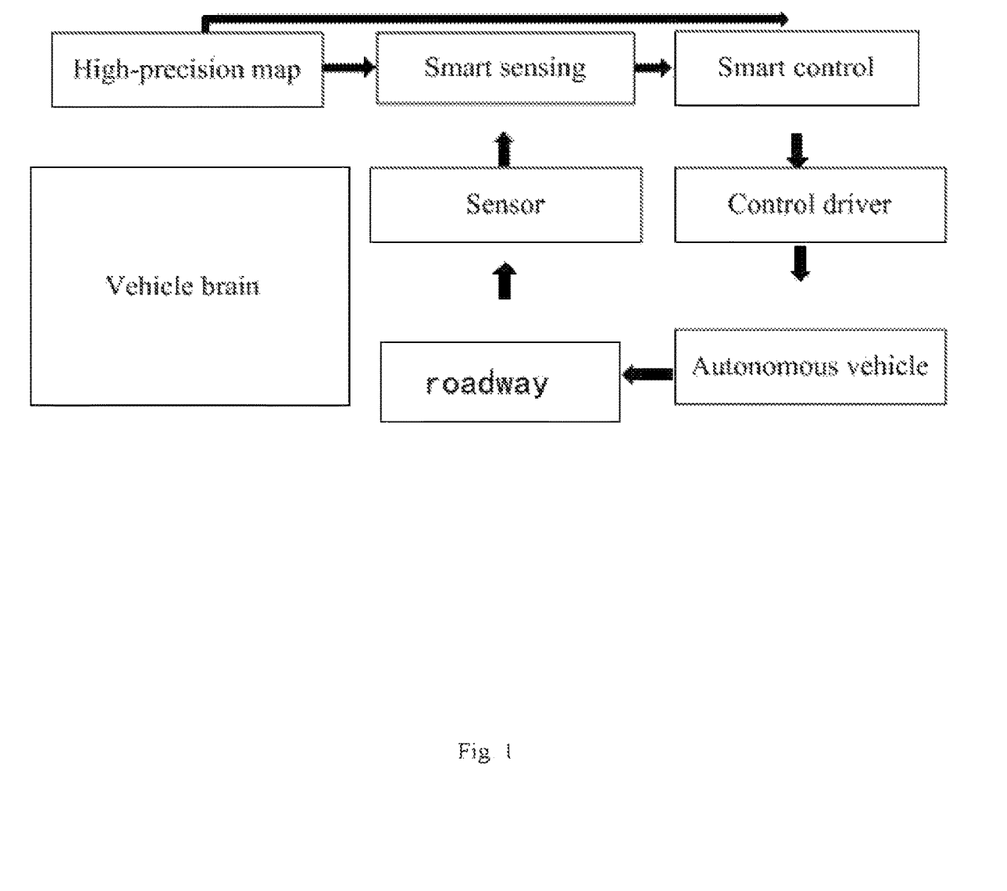
FIG. 1 is a schematic diagram of a working principle of an autonomous vehicle in the prior art.

FIG. 1 is a schematic diagram of a working principle of an autonomous vehicle in the prior art. As shown in FIG. 1, a high-precision map refers to a map which has a centimeter-level precision, can be refined to a travel route and can distinguish situations on a bridge, situations below a bridge, cameras, road signs, zebra crossing and the like; smart sensing refers to deeply understanding environment information around the vehicle based on merge of multiple sensors; smart control refers to automatic planning, vehicle control and the like.

Hacker's hijacking is an important safety problem with which the autonomous vehicle is confronted. Regarding this problem, there is not yet an effective solution in the prior art, so the safety of the autonomous vehicle is reduced.

SUMMARY OF THE DISCLOSURE

In view of the above, the present disclosure provides a method and apparatus for anti hacker's hijacking of an autonomous vehicle, a device and a storage medium, which can improve safety of the autonomous vehicle.

Specific technical solutions are as follows:

A method for anti hacker's hijacking of an autonomous vehicle, comprising:

monitoring an autonomous vehicle's running data;

determining whether the autonomous vehicle is hijacked by a hacker according to a monitoring result and a preset rule;

activating an anti-hijack emergency handling operation if it is determined that the autonomous vehicle is hijacked by the hacker.

According to a preferred embodiment of the present disclosure, the monitoring the autonomous vehicle's running data comprises:

monitoring whether the autonomous vehicle's basic software functions are in an in-use state;

monitoring a driving safety state of the autonomous vehicle.

According to a preferred embodiment of the present disclosure, the activating the anti-hijack emergency handling operation comprises:

disconnecting a network connection between the autonomous vehicle and the external.

According to a preferred embodiment of the present disclosure, the activating the anti-hijack emergency handling operation further comprises one of the following or any combinations thereof:

forcedly killing all user level processes which are user state process related to a passenger of the vehicle and a destination;

setting all basic software functions to be in an in-use state;

turning on emergency flashers, pulling over and reporting to the police.

According to a preferred embodiment of the present disclosure, the method further comprises:

when an emergency button of the autonomous vehicle is pressed and the autonomous vehicle system is switched to a protection mode, activating the anti-hijack emergency handling operation.

According to a preferred embodiment of the present disclosure, the activating the anti-hijack emergency handling operation comprises one of the following or any combinations thereof:

setting all basic software functions to be in an in-use state;

turning on emergency flashers, pulling over and reporting to the police;

when the emergency button is pressed, the network connection between the autonomous vehicle and the external may be disconnected in a mechanical manner.

An apparatus for anti hacker's hijacking of an autonomous vehicle, comprising a state monitoring unit and an emergency handling unit;

the state monitoring unit is configured to monitor an autonomous vehicle's running data, determine whether the autonomous vehicle is hijacked by a hacker according to a monitoring result and a preset rule, and notify the emergency handling unit if it is determined that the autonomous vehicle is hijacked by the hacker;

the emergency handling unit is configured to activate an anti-hijack emergency handling operation.

According to a preferred embodiment of the present disclosure, the state monitoring unit comprises a monitoring subunit and a judging subunit;

the monitoring subunit is configured to monitor whether the autonomous vehicle's basic software functions are in an in-use state, monitor a driving safety state of the autonomous vehicle, and send a monitoring result to the judging subunit;

the judging subunit is configured to determine whether the autonomous vehicle is hijacked by a hacker according to the monitoring result and the preset rule, and notify the emergency handling unit if it is determined that the autonomous vehicle is hijacked by the hacker.

According to a preferred embodiment of the present disclosure, the emergency handling unit disconnects a network connection between the autonomous vehicle and the external.

According to a preferred embodiment of the present disclosure, the emergency handling unit further executes one of the following or any combinations thereof:

forcedly killing all user level processes which are user state process related to a passenger of the vehicle and a destination;

setting all basic software functions to be in an in-use state;

turning on emergency flashers, pulling over and reporting to the police.

According to a preferred embodiment of the present disclosure, the emergency handling unit is further configured to, when the emergency button of the autonomous vehicle is pressed and the autonomous vehicle system is switched to the protection mode, activate the anti-hijack emergency handling operation.

According to a preferred embodiment of the present disclosure, the anti-hijack emergency handling operation executes one of the following or any combinations thereof:

setting all basic software functions to be in an in-use state;

turning on emergency flashers, pulling over and reporting to the police;

when the emergency button is pressed, the network connection between the autonomous vehicle and the external may be disconnected in a mechanical manner.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, the above solutions of the present disclosure may be employed to monitor the running data of the autonomous vehicle, and determine whether the autonomous vehicle is hijacked by a hacker according to the monitoring result and the preset rule. Once the autonomous vehicle is determined as being hijacked by the hacker, the anti-hijack emergency handling operation may be activated to improve the autonomous vehicle's safety.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Figure 2:
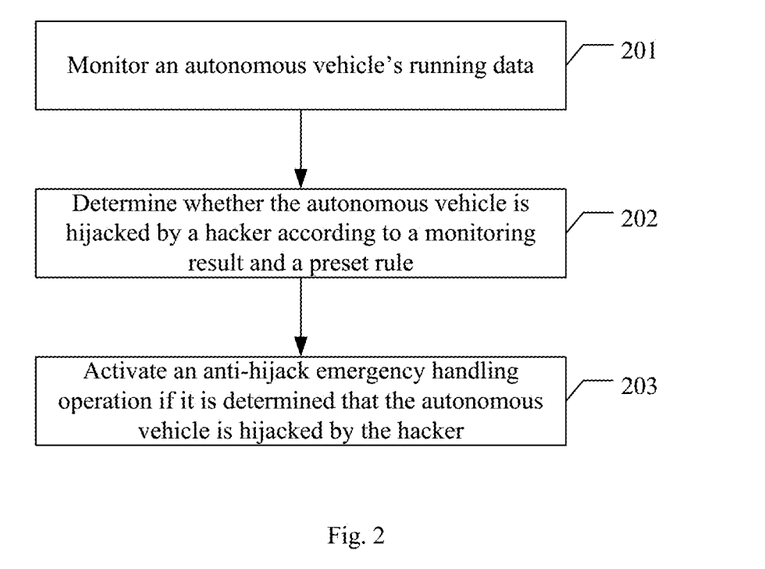
FIG. 2 is a flow chart of a first embodiment of a method of anti hacker's hijacking of an autonomous vehicle according to the present disclosure.

FIG. 2 is a flow chart of a first embodiment of a method of anti hacker's hijacking of an autonomous vehicle according to the present disclosure. As shown in FIG. 2, the embodiment comprises the following specific implementation mode.

In 201, an autonomous vehicle's running data are monitored.

Preferably, it is feasible to monitor whether the autonomous vehicle's basic software functions are in an in-use state, and monitor a driving safety state of the autonomous vehicle.

Wherein the basic software functions may comprise a camera, a radar and the like. Monitoring is performed as to whether these basic software functions are in an in-use state.

Monitoring a driving safety state of the autonomous vehicle may refer to monitoring the autonomous vehicle's accelerator changes, speed changes, steering angle changes, braking changes and the like.

In practical application, it is possible to divide the autonomous vehicle's system process into a system level process and a user level process, and strictly isolate rights.

The system level process is a self-running process after start of the autonomous vehicle. The user level process is a user state process related to a passenger of the vehicle and a destination. The user level process dos not have a right to operate the system level process.

The system level process may monitor the vehicle hardware, vehicle software and the driving safety state, and determine whether the autonomous vehicle malfunctions according to a monitoring result.

For example, it is feasible to determine whether the autonomous vehicle's hardware malfunctions according to the monitoring result of the vehicle hardware, and determine whether the autonomous vehicle is hijacked by a hacker according to the monitoring result of the vehicle software and the driving safety state.

Correspondingly, in 202, whether the autonomous vehicle is hijacked by a hacker according to the monitoring result and a preset rule.

A hacker's hijack-finding rule may be built in the autonomous vehicle system in advance so that whether the autonomous vehicle is hijacked by the hacker can be determined according to the monitoring result and the rule.

For example, the system level process may monitor, in real time, whether the autonomous vehicle's basic software functions are in the in-use state, and monitor the driving safety state of the autonomous vehicle in real time. Regarding the monitoring result obtained each time, it is feasible to use the hacker's hijack-finding rule to analyze and judge the monitoring result to determine whether the autonomous vehicle is hijacked by the hacker.

The hacker's hijack-finding rule may be obtained after a safety expert's assessment, and may be updated at any time according to needs. The autonomous vehicle system may automatically obtain an updated rule upon upgrading each time.

A specific rule meant by the hacker's hijack-finding rule may depend on actual situations.

For example, during the travel of the autonomous vehicle, the camera, radar and the like all should be in the in-use state; if they are monitored as being in a closed state, it may be judged that the autonomous vehicle is hijacked by the hacker. Again for example, if it is monitored that behaviors such as many times of sudden acceleration and/or sudden turn happen with the autonomous vehicle in a short time period, it may be judged that the autonomous vehicle is hijacked by the hacker.

In 203, if the autonomous vehicle is determined as being hijacked by a hacker, anti-hijack emergency handling operation is activated.

For example, if the system level progress determines that the autonomous vehicle is hijacked by the hacker according to the monitoring result and the hacker's hijack-finding rule, the anti-hijack emergency handing operation may be activated to ensure the autonomous vehicle's safety.

Specific content included in the anti-hijack emergency handling operation may depend on actual needs. For example, a network connection between the autonomous vehicle and the external may be disconnected. Since the network connection is disconnected, the hacker cannot continue to intrude the autonomous vehicle system.

On this basis, it is possible to further execute other operations, including one of the following or any combinations thereof:

forcedly killing all user level processes;
setting all basic software functions to be in an in-use state;
turning on emergency flashers, pulling over and reporting to the police.

Forcedly killing all user level processes means forbidding the user level progresses to be further used.

If the monitoring result shows that partial or all basic software functions are in a closed state, these basic software functions in the closed state may be restored to an in-use state so that all basic software functions are in the in-use state.

As can be seen from the above introduction, the manner stated in the present embodiment may be employed to monitor the running data of the autonomous vehicle, and determine whether the autonomous vehicle is hijacked by a hacker according to the monitoring result and the preset rule. Once the autonomous vehicle is determined as being hijacked by the hacker, the anti-hijack emergency handling operation may be activated to improve the autonomous vehicle's safety.

Figure 3:
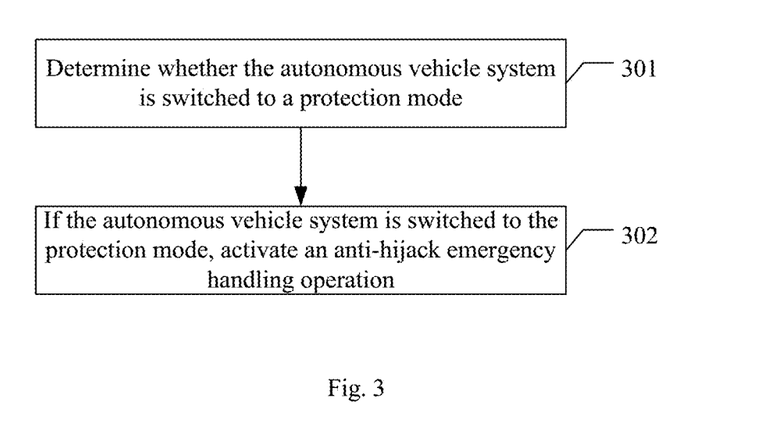
FIG. 3 is a flow chart of a second embodiment of a method of anti hacker's hijacking of an autonomous vehicle according to the present disclosure.

FIG. 3 is a flow chart of a second embodiment of a method of anti hacker's hijacking of an autonomous vehicle according to the present disclosure. As shown in FIG. 3, the embodiment comprises the following specific implementation mode.

In 301, whether the autonomous vehicle system is switched to a protection mode is determined;

In 302, if the autonomous vehicle system is switched to the protection mode, an anti-hijack emergency handling operation is activated.

Preferably, an emergency button may be provided on an operation panel of the autonomous vehicle.

When there is a passenger in the autonomous vehicle, if the passenger judges, according to his own feeling, that the autonomous vehicle is hijacked by a hacker, for example, if behaviors such as many times of sudden acceleration and/or sudden turn happen with the autonomous vehicle in a short time period, he may press the emergency button.

When the emergency button is pressed, the autonomous vehicle may be switched to the protection mode, and the anti-hijack emergency handling operation is activated. The protection mode is similar to Windows' safety mode.

For example, when the emergency button is pressed, the autonomous vehicle system may restart and switched to the protection mode after the restart. In the protection mode, the user level process cannot be activated, and only the system level process can be activated. The reactivating the anti-hijack emergency handling operation may comprise one of the following or any combinations thereof: setting all basic software functions to be in an in-use state; turning on emergency flashers, pulling over and reporting to the police.

In addition, when the emergency button is pressed, the network connection between the autonomous vehicle and the external may be disconnected in a mechanical manner.

How to disconnect the network connection between the autonomous vehicle and the external in a mechanical manner may depend on actual needs, so long as a corresponding purpose can be achieved.

As such, when the system does not activate the anti-hijack emergency handling operation for a certain reason, the anti-hijack emergency handling operation is activated through manual operation. Manual activation and activation by the system cooperate with each other, thereby further improving the safety of the autonomous vehicle.

The above introduces the method embodiments. The solution of the present disclosure will be further described through an apparatus embodiment.

Figure 4:
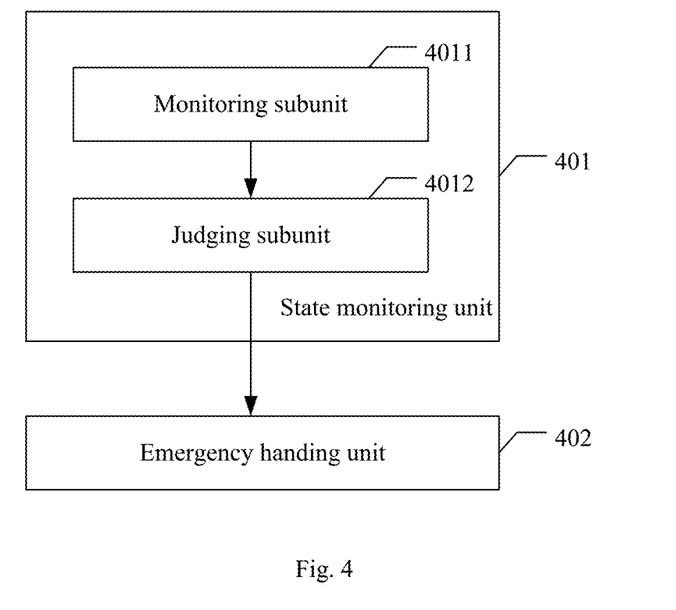
FIG. 4 is a schematic diagram of components of an apparatus for anti hacker's hijacking of an autonomous vehicle according to the present disclosure.

FIG. 4 is a schematic diagram of components of an apparatus for anti hacker's hijacking of a autonomous vehicle according to the present disclosure. As shown in FIG. 4, the apparatus comprises a state monitoring unit 401 and an emergency handling unit 402.

The state monitoring unit 401 is configured to monitor an autonomous vehicle's running data, determine whether the autonomous vehicle is hijacked by a hacker according to the monitoring result and a preset rule, and notify the emergency handling unit 402 if it is determined that the autonomous vehicle is hijacked by the hacker.

The emergency handling unit 402 is configured to activate an anti-hijack emergency handling operation.

As shown in FIG. 3, the state monitoring unit 401 may specifically comprise a monitoring subunit 4011 and a judging subunit 4012.

The monitoring subunit 4011 is configured to monitor whether the autonomous vehicle's basic software functions are in an in-use state, and monitor a driving safety state of the autonomous vehicle, and send a monitoring result to the judging subunit 4012.

Wherein the basic software functions may comprise a camera, a radar and the like.

Monitoring the driving safety state of the autonomous vehicle may refer to monitoring the autonomous vehicle's accelerator changes, speed changes, steering angle changes, braking changes and the like.

The judging subunit 4012 is configured to determine whether the autonomous vehicle is hijacked by a hacker according to the obtained monitoring result and the preset rule, and notify the emergency handling unit 402 if it is determined that the autonomous vehicle is hijacked by the hacker.

The rule may be the hacker's hijack-finding rule which may be obtained after a safety expert's assessment, and may be updated at any time according to needs.

A specific rule meant by the hacker's hijack-finding rule may depend on actual situations.

For example, during the travel of the autonomous vehicle, the camera, radar and the like all should be in the in-use state; if they are monitored as being in a closed state, it may be judged that the autonomous vehicle is hijacked by the hacker. Again for example, if it is monitored that behaviors such as many times of sudden acceleration and/or sudden turn happen with the autonomous vehicle in a short time period, it may be judged that the autonomous vehicle is hijacked by the hacker.

After receiving the notification from the state monitoring unit 401, the emergency handling unit 402 activates the anti-hijack emergency handling operation.

For example, the emergency handling unit 402 may disconnect a network connection between the autonomous vehicle and the external. Since the network connection is disconnected, the hacker cannot continue to intrude the autonomous vehicle system, thereby improving the safety of the autonomous vehicle.

On this basis, the emergency handling unit 402 may further execute one of the following or any combinations thereof:

forcedly killing all user level processes which are user state process related to a passenger of the vehicle and a destination;

setting all basic software functions to be in an in-use state;

turning on emergency flashers, pulling over and reporting to the police.

Forcedly killing all user level processes means forbidding the user level progresses to be further used.

If the monitoring result shows that partial or all basic software functions are in a closed state, these basic software functions in the closed state may be restored to an in-use state so that all basic software functions are in the in-use state.

As can be seen from the above introduction, the manner stated in the present embodiment may be employed to monitor the running data of the autonomous vehicle, and determine whether the autonomous vehicle is hijacked by a hacker according to the monitoring result and the preset rule. Once the autonomous vehicle is determined as being hijacked by the hacker, the anti-hijack emergency handling operation may be activated to improve the autonomous vehicle's safety.

In addition, an emergency button may be provided on an operation panel of the autonomous vehicle.

When there is a passenger in the autonomous vehicle, if the passenger judges, according to his own feeling, that the autonomous vehicle is hijacked by a hacker, he may press the emergency button.

When the emergency button is pressed, the autonomous vehicle may be switched to the protection mode. The protection mode is similar to Windows' safety mode.

Correspondingly, when the emergency button of the autonomous vehicle is pressed and the autonomous vehicle system is switched to the protection mode, the emergency handling unit 402 may activate the anti-hijack emergency handling operation.

The anti-hijack emergency handling operation may comprise one of the following or any combinations thereof:

setting all basic software functions to be in an in-use state;

turning on emergency flashers, pulling over and reporting to the police.

In addition, when the emergency button is pressed, the network connection between the autonomous vehicle and the external may be disconnected in a mechanical manner.

That is to say, the anti-hijack emergency handling operation may also be activated through manual operation, thereby further improving the safety of the autonomous vehicle.

Reference may be made to corresponding depictions in the aforesaid method embodiment for a specific workflow of the apparatus embodiment shown in FIG. 4. The workflow is not detailed any more.

Figure 5:
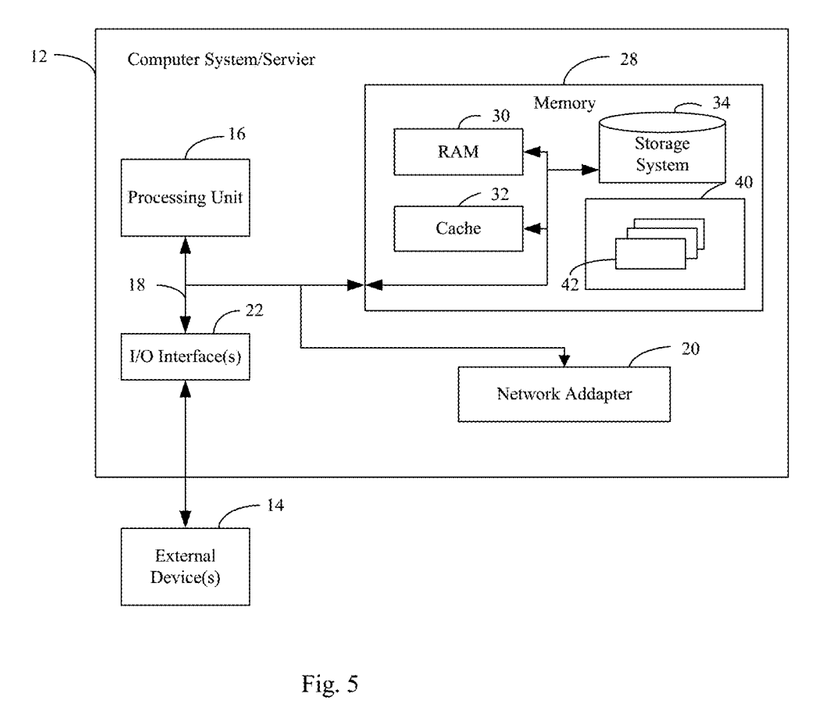
FIG. 5 illustrates a block diagram of an example computer system/server 12 adapted to implement an implementation mode of the present disclosure.

FIG. 5 illustrates a block diagram of an example computer system/server 12 adapted to implement an implementation mode of the present disclosure. The computer system/server 12 shown in FIG. 5 is only an example and should not bring about any limitation to the function and scope of use of the embodiments of the present disclosure.

As shown in FIG. 5, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 5, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiments shown in FIG. 2 and FIG. 3.

For example, it is feasible to monitor the running data of the autonomous vehicle, determine whether the autonomous vehicle is hijacked by a hacker according to the monitoring result and the preset rule, and activate the anti-hijack emergency handling operation if the autonomous vehicle is determined as being hijacked by the hacker.

Activating the anti-hijack emergency handling operation comprises: disconnecting a network connection between the autonomous vehicle and the external, and additionally may further comprise one of the following or any combinations thereof:

forcedly killing all user level processes which are user state process related to a passenger of the vehicle and a destination;

setting all basic software functions to be in an in-use state;

turning on emergency flashers, pulling over and reporting to the police.

Again for example, when the emergency button on the autonomous vehicle is pressed and the autonomous vehicle system is switched to the protection mode, the anti-hijack emergency handling operation is activated.

Activating the anti-hijack emergency handling operation may comprise one of the following or any combinations thereof:

setting all basic software functions to be in an in-use state;

turning on emergency flashers, pulling over and reporting to the police;

wherein when the emergency button is pressed, the network connection between the autonomous vehicle and the external may be disconnected in a mechanical manner.

Reference may be made to related depictions in the above method embodiments for specific implementations, which will not be detailed any more.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for anti hacker's hijacking of an autonomous vehicle, wherein the method comprises:

monitoring the autonomous vehicle's running data, the monitoring comprising at least (a) monitoring whether the autonomous vehicle's basic functions are in an in-use state and (b) monitoring a driving safety state of the autonomous vehicle, the driving safety state of the autonomous vehicle comprising at least one of accelerator changes, speed changes, steering angle changes, and braking changes of the autonomous vehicle;

determining whether the autonomous vehicle is hijacked by a hacker according to a monitoring result and a preset hijack-finding rule, the preset hijack-finding rule being related to the autonomous vehicle's hardware malfunction, the autonomous vehicle's basic software function, and the driving safety state of the autonomous vehicle;

activating an anti-hijack emergency handling operation if it is determined that the autonomous vehicle is hijacked by the hacker; and updating the preset hijack-finding rule by updating a system of the autonomous vehicle.

2. The method according to claim 1, wherein the activating the anti-hijack emergency handling operation comprises:

disconnecting a network connection between the autonomous vehicle and the external.

3. The method according to claim 2, wherein the activating the anti-hijack emergency handling operation further comprises one of the following or any combinations thereof:

forcedly killing all user level processes which are user state process related to a passenger of the vehicle and a destination;

setting all basic software functions to be in an in-use state;

turning on emergency flashers, pulling over and reporting to the police.

4. The method according to claim 1, wherein the method further comprises:

when an emergency button of the autonomous vehicle is pressed and the autonomous vehicle system is switched to a protection mode, activating the anti-hijack emergency handling operation.

5. The method according to claim 4, wherein the activating the anti-hijack emergency handling operation comprises one of the following or any combinations thereof:

setting all basic software functions to be in an in-use state;

turning on emergency flashers, pulling over and reporting to the police;

when the emergency button is pressed, the network connection between the autonomous vehicle and the external may be disconnected in a mechanical manner.

6. A computer device, comprising a memory, a processor and a computer program which is stored on the memory and runs on the processor, wherein the processor, upon executing the program, implements the following operations:

monitoring an autonomous vehicle's running data, the monitoring comprising at least (a) monitoring whether the autonomous vehicle's basic functions are in an in-use state and (b) monitoring a driving safety state of the autonomous vehicle, the driving safety state of the autonomous vehicle comprising at least one of accelerator changes, speed changes, steering angle changes, and braking changes of the autonomous vehicle;

determining whether the autonomous vehicle is hijacked by a hacker according to a monitoring result and a preset hijack-finding rule, the preset hijack-finding rule being related to the autonomous vehicle's hardware malfunction, the autonomous vehicle's basic software function, and the driving safety state of the autonomous vehicle;

activating an anti-hijack emergency handling operation if it is determined that the autonomous vehicle is hijacked by the hacker; and updating the preset hijack-finding rule by updating a system of the autonomous vehicle.

7. The computer device according to claim 6, wherein the activating the anti-hijack emergency handling operation comprises:

disconnecting a network connection between the autonomous vehicle and the external.

8. The computer device according to claim 7, wherein the activating the anti-hijack emergency handling operation further comprises one of the following or any combinations thereof:

forcedly killing all user level processes which are user state process related to a passenger of the vehicle and a destination;

setting all basic software functions to be in an in-use state;

turning on emergency flashers, pulling over and reporting to the police.

9. The computer device according to claim 6, wherein the operation further comprises:

when an emergency button of the autonomous vehicle is pressed and the autonomous vehicle system is switched to a protection mode, activating the anti-hijack emergency handling operation.

10. The computer device according to claim 9, wherein the activating the anti-hijack emergency handling operation comprises one of the following or any combinations thereof:

setting all basic software functions to be in an in-use state;

turning on emergency flashers, pulling over and reporting to the police;

when the emergency button is pressed, the network connection between the autonomous vehicle and the external may be disconnected in a mechanical manner.

11. A non-transitory computer-readable storage medium on which a computer program is stored, wherein the program, when executed by a processor, implements operations comprising:

monitoring an autonomous vehicle's running data, the monitoring comprising at least (a) monitoring whether the autonomous vehicle's basic functions are in an in-use state and (b) monitoring a driving safety state of the autonomous vehicle, the driving safety state of the autonomous vehicle comprising at least one of accelerator changes, speed changes, steering angle changes, and braking changes of the autonomous vehicle;

determining whether the autonomous vehicle is hijacked by a hacker according to a monitoring result and a preset hijack-finding rule, the preset hijack-finding rule being related to the autonomous vehicle's hardware malfunction, the autonomous vehicle's basic software function, and the driving safety state of the autonomous vehicle;

activating an anti-hijack emergency handling operation if it is determined that the autonomous vehicle is hijacked by the hacker; and updating the preset hijack-finding rule by updating a system of the autonomous vehicle.

12. The non-transitory computer-readable storage medium according to claim 11, wherein the activating the anti-hijack emergency handling operation comprises:

disconnecting a network connection between the autonomous vehicle and the external.

13. The non-transitory computer-readable storage medium according to claim 12, wherein the activating the anti-hijack emergency handling operation further comprises one of the following or any combinations thereof:

forcedly killing all user level processes which are user state process related to a passenger of the vehicle and a destination;

setting all basic software functions to be in an in-use state;
turning on emergency flashers, pulling over and reporting to the police.

14. The non-transitory computer-readable storage medium according to claim 11, wherein
the operation further comprises:
when an emergency button of the autonomous vehicle is pressed and the autonomous vehicle system is switched to a protection mode, activating the anti-hijack emergency handling operation.

15. The non-transitory computer-readable storage medium according to claim 14, wherein
the activating the anti-hijack emergency handling operation comprises one of the following or any combinations thereof:
setting all basic software functions to be in an in-use state;
turning on emergency flashers, pulling over and reporting to the police;
when the emergency button is pressed, the network connection between the autonomous vehicle and the external may be disconnected in a mechanical manner.

* * * * *